Nov. 17, 1931. D. P. HEATH Re. 18,253

REFRIGERATOR AND REFRIGERATING APPARATUS

Original Filed April 6, 1925 4 Sheets-Sheet 1

Inventor
Delos P. Heath
By Livingance and Van Antwerp
Attorneys

Nov. 17, 1931. D. P. HEATH Re. 18,253

REFRIGERATOR AND REFRIGERATING APPARATUS

Original Filed April 6, 1925 4 Sheets-Sheet 2

Inventor
Delos P. Heath
by
Livernance and Van Antwerp
Attorneys

Nov. 17, 1931. D. P. HEATH Re. 18,253

REFRIGERATOR AND REFRIGERATING APPARATUS

Original Filed April 6, 1925 4 Sheets-Sheet 3

Inventor
Delos P. Heath
By Livernace and Van Antwerp
Attorneys

Nov. 17, 1931. D. P. HEATH Re. 18,253

REFRIGERATOR AND REFRIGERATING APPARATUS

Original Filed April 6, 1925 4 Sheets-Sheet 4

Inventor
Delos P. Heath
By Lorrance and Van Antwerp
Attorneys

Reissued Nov. 17, 1931 Re. 18,253

UNITED STATES PATENT OFFICE

DELOS P. HEATH, OF DETROIT, MICHIGAN

REFRIGERATOR AND REFRIGERATING APPARATUS

Original No. 1,726,486, dated August 27, 1929, Serial No. 20,912, filed April 6, 1925. Application for reissue filed September 8, 1930. Serial No. 480,603.

This invention relates to a refrigerator construction including a refrigerating apparatus and its installation in a box or case whereby the apparatus performs the combined functions of a vertical partition to divide the box into compartments, serves as a support for the shelves used, and absorbs heat to thereby cool the interior of the box.

One primary object and purpose of the present invention is to provide a refrigerating unit which, when installed in the refrigerator box, serves as a vertical partition for the same doing away with the usual partial vertical partition required in refrigerators and so constructing the unit that the part thereof which serves as the partition may be located at any desired point so as to divide the box into compartments of either equal or different sizes and to seal them from each other.

A further object of the invention is to construct a refrigerating unit which may be made, assembled and charged at its place of manufacture, with the manufacture of boxes in which it is to be installed at another place or factory, the refrigerating unit being capable of shipment while in completely assembled and charged condition and then readily installed in the refrigerator boxes.

A still further object of the invention and one of importance resides in the construction of the refrigerating unit and particularly in the tank construction thereof, which is of novel form and comprises many novel features of construction and arrangement of parts whereby it is capable of a variety of uses. For instance the tank itself may be used in other places than as a part of a refrigerating mechanism though its construction is very well adapted for such refrigerating use.

Many other objects and purposes than those specifically stated will be apparent as an understanding of the invention is had from the following description taken in connection with the accompanying drawings, in which, Fig. 1 is a perspective view, with some parts broken away and in section, showing a refrigerator equipped with refrigerating apparatus and installed therein in accordance with my invention.

Like reference characters refer to like parts in the different figures of the drawings.

Figure 1:
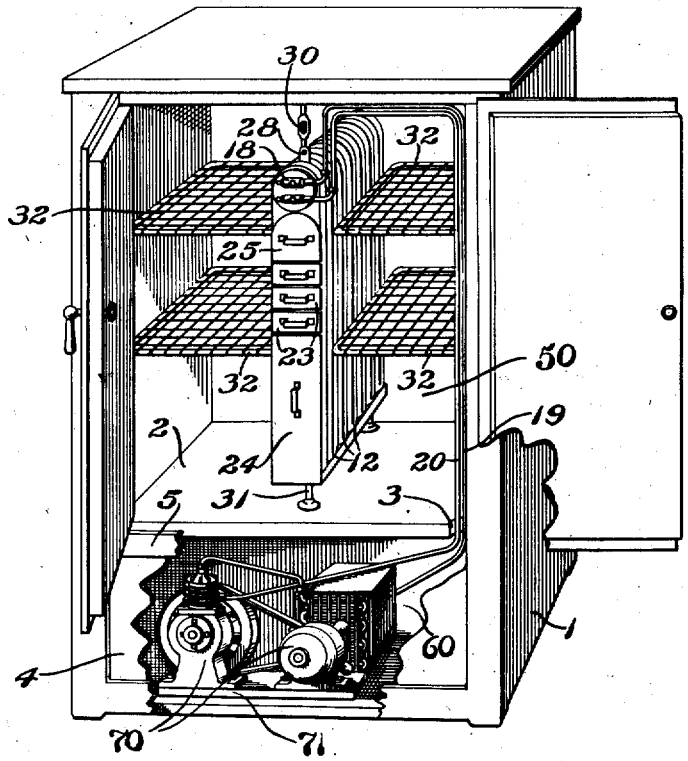

The refrigerator box 1 may be, generally, of any desired construction and is equipped with a horizontal partition 2, some distance above its lower end in one front corner of which a notch or recess 3 is cut, as shown. Below this partition the front of the refrigerator is closed by a removable panel 4 at the upper portion of which is a removable cross rail 5 adapted to be secured in place. The front of the refrigerator above said rail 5 is adapted to be closed by doors which may be opened for access to the compartments above the partition 2.

The horizontal partition 2 divides the refrigerator box 1 into an upper compartment 50 and a lower compartment 60. The lower compartment receives a compressor unit 70 mounted upon the base 71, said base being removably mounted in the lower compartment.

Figure 7:
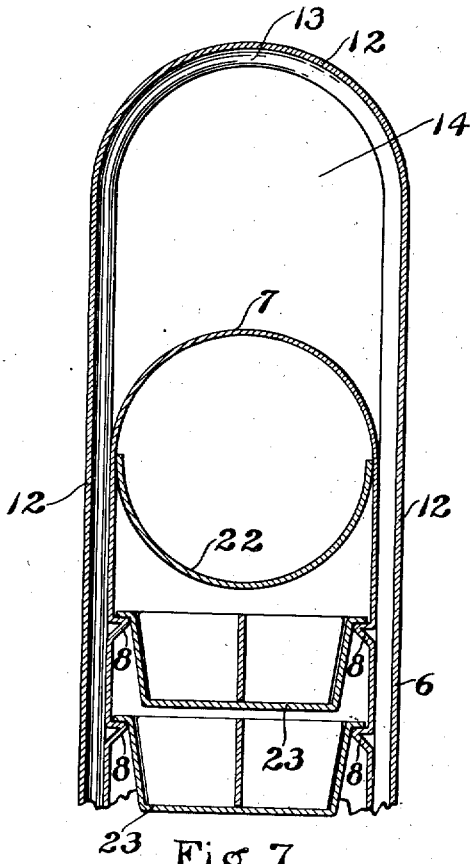
Fig. 7 is a fragmentary transverse vertical section through the upper portion of the tank.
Figure 8:
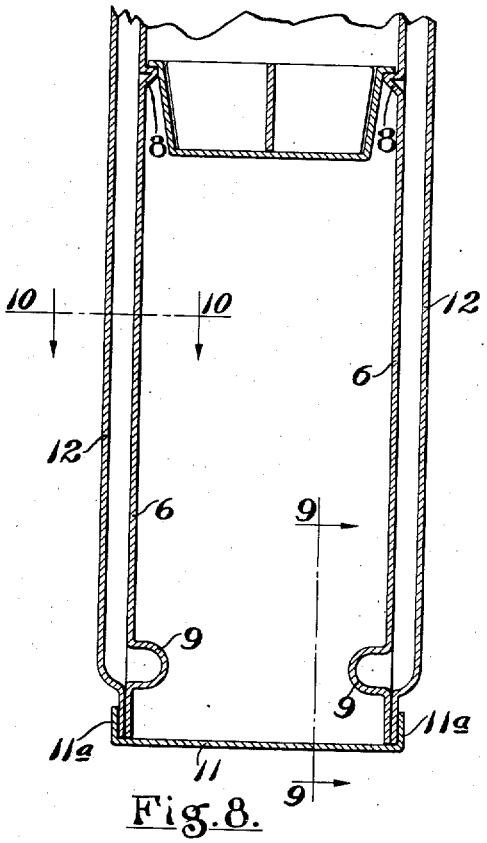
Fig. 8 is a similar section through the lower portion thereof.
Figure 9:
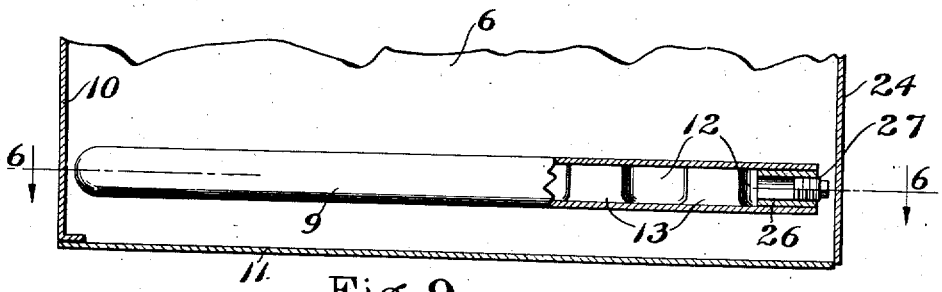
Fig. 9 is a fragmentary vertical section taken on the plane of line 9—9 of Fig. 8.
Figure 10:
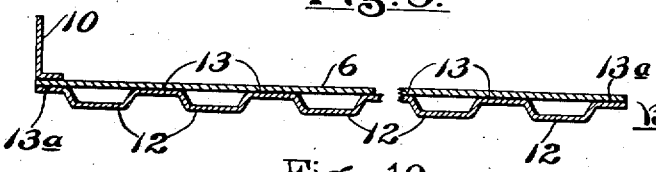
Fig. 10 is a fragmentary horizontal section on the plane of line 10—10 of Fig. 8.

In the construction of the refrigerating apparatus a tank is provided having an inner shell of sheet metal with spaced apart vertical sides 6 integrally connected by an arch 7, best shown in Fig. 7. A short distance below this arch a plurality of spaced apart horizontal ribs 8 are pressed inwardly from each side 6 preferably of the shape shown which, as will later appear, serve a number of functions in the construction. Also near their lower edges the sides 6 are formed with inwardly pressed horizontal beads 9. At the back this inner shell structure is closed by a back plate 10 and at the bottom by a bottom plate 11, the front being open.

Figure 2:
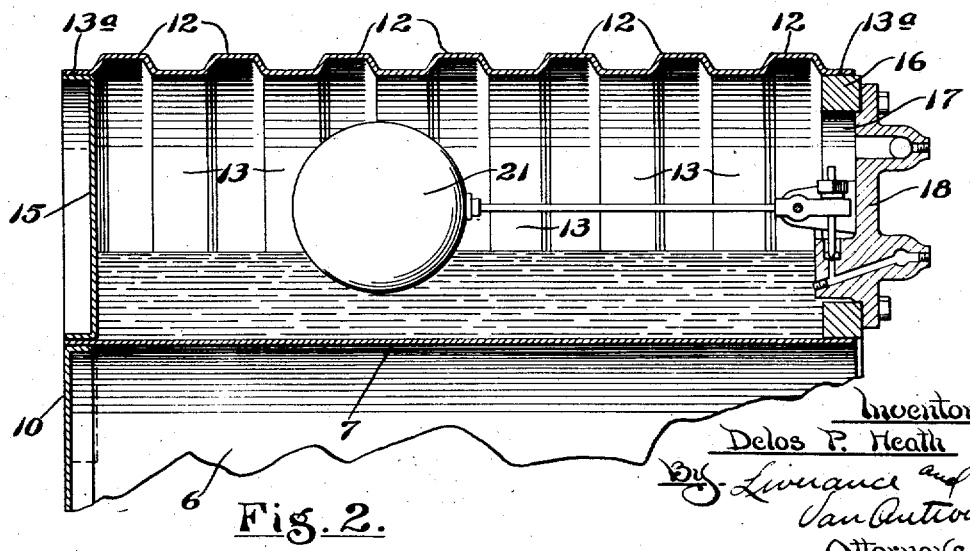
Fig. 2 is an enlarged central vertical section taken through the upper portion of the tank.
Figure 3:
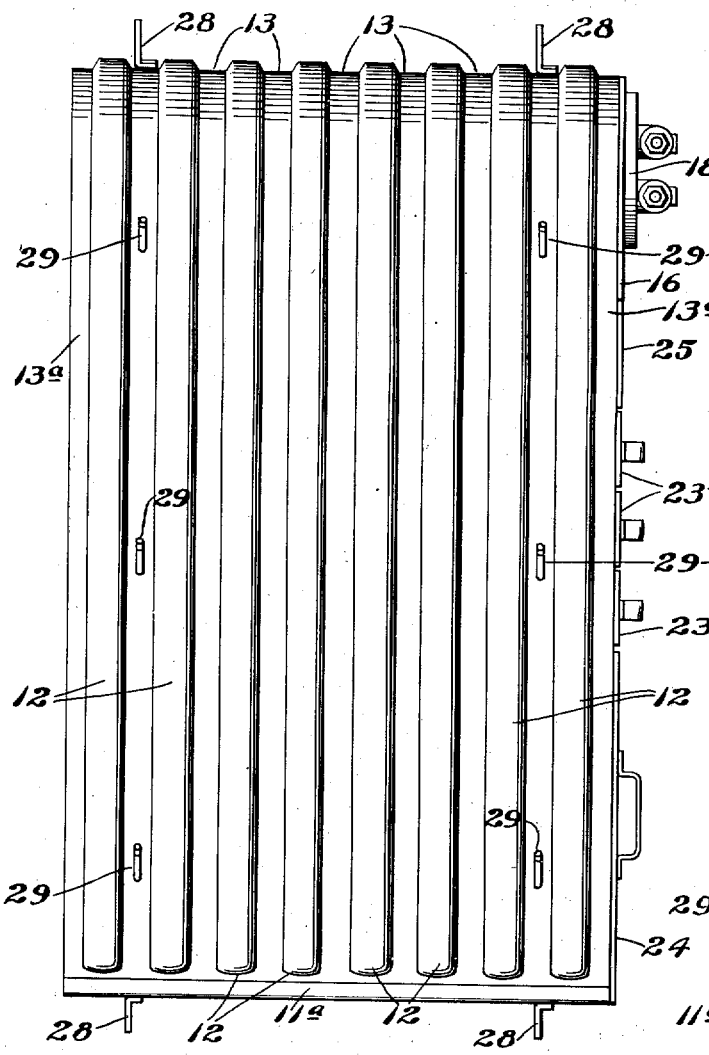
Fig. 3 is an enlarged side elevation of said tank.
Figure 4:
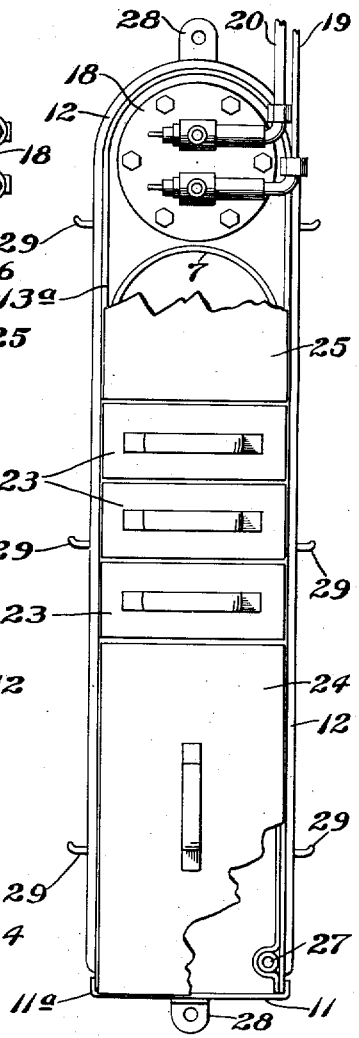
Fig. 4 is a front elevation thereof.
Figure 5:
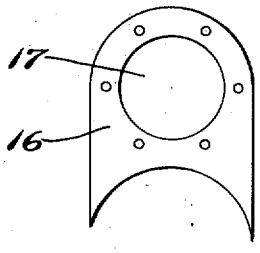
Fig. 5 is a front elevation of a detail of construction relating to a plate adapted to close the front end of the upper part of the tank.
Figure 6:
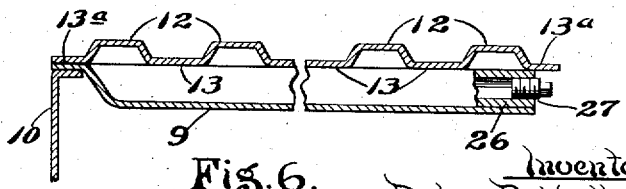
Fig. 6 is a fragmentary horizontal section taken on the plane of line 6—6 of Fig. 9.

Over the inner shell structure thus made, an outer shell is located being formed from a single plate of sheet metal and with alternate outwardly pressed ribs or corrugations 12 and connecting sections 13 between. This outer shell is formed into substantially U-shape with its arch located a distance above the arch 7, making a chamber 14 at the upper end of the tank between the two arches. The outer shell is permanently connected to the inner shell by welding the sections 13 and the flanges $13^a$ at the edges of the other shell to the side plates 6 of the inner shell. It will be noted that the bottom 11 is formed with up-turned side flanges $11^a$ and that the lower edges of the outer shell pass within the same and lie against the lower portions of the sides 6, these parts being securely welded together. At the rear end of the tank the space between the arch 7 and the arch of the outer shell is filled by a filler plate 15 (see Fig. 2) and at the front by a member 16 (see Fig. 5) in which an opening 17 is made adapted to be filled by a head 18 from which the usual pipes 19 and 20 for conducting the refrigerant lead to the compressor mechanism of the refrigerating apparatus used in apparatus of this character.

The chamber 14 between the arches of the inner and outer shells as well as the spaces between the sides 6 of the inner shell and the outwardly pressed corrugations 12 of the outer shell are adapted to receive the refrigerant which may be of any desired type. The level of the refrigerant is controlled by the usual float 21 shown in Fig. 2. The mechanism relating to the compressor and the control of the refrigerant, as it forms no part of the present invention, is not described in detail. Inasmuch as the pressure within the chamber 14 and to which the refrigerant is subjected is high at times the structure has to be of considerable strength and at the same time should not be very heavy or bulky. With the corrugated outer shell shown this strength is obtained, and to brace and strengthen the inner shell the inwardly pressed ribs 8 and 9 as well as the arch construction at 7 are provided. In addition it will be noted that the ribs 8 and beads 9 make connections between the various spaces enclosed by the outward corrugations 12 so that there is a free circulation permitted of the refrigerant.

The inner shell 6 may be used for storage or for various other purposes. For instance in the upper portion of the shell a semicircular trough 22 is located and welded in place, making a substantially circular compartment at the upper end. Below this compartment a number of trays 23 are mounted, being supported on the inwardly extending ribs 8, which serve this additional function beside that of strengthening and reinforcing the inner shell and providing circulation passages for the refrigerant. And in the lower end of the shell a storage compartment indicated at 24 may be utilized. The upper compartment above the trays 23 is adapted to have its front end closed by a removable cover 25 and in this various articles of food or drink may be placed and the same is true with respect to the lower compartment at 24. In the trays 23, if desired, water may be placed for the production of ice.

In order to facilitate cleaning the refrigerant holding chamber and spaces the front ends of each bead 9 may be equipped with a sleeve 26 into the front end of which a plug 27 is screwed adapted to be removed for cleaning the tank should this become necessary. This is likely to happen but rarely when the device is used in refrigerating apparatus but it is evident that the tank construction is capable of use in other relations, as for instance in a boiler or as a steam or hot water radiator wherein cleaning out is of much greater importance. In fact this construction and its use in connection with refrigerating apparatus is technically a boiler, the refrigerant in liquid form boiling and evaporating readily with the reduction of pressure thereby absorbing heat from the outside and reducing the temperature of the surrounding parts, hence the refrigerating action and result.

The tank as thus constructed is adapted to be located vertically in the refrigerator box and as one means of locating and securing it in place it is equipped with upwardly and downwardly extending angle brackets 28 at its upper and lower ends. Also at a number of points at its sides shelf supports 29 are secured and extend outwardly. Suitable suspension members 30 attached to the upper side of the refrigerator compartment and connected with the upper brackets 28, and other supports 31 secured to the horizontal partition 22 and connected in any suitable manner with the lower brackets 28 locate the tank in place and hold it in desired position. It is evident that the tank may be located midway between the sides of the refrigerator box or closer to one side than the other and also that there are open spaces both above and below the tank for the free circulation of air in the compartment. Shelves 32 of usual type may be carried on the shelf supports 29 on the tank and on like supports projecting inwardly from the vertical sides of the refrigerator box.

When installed in a refrigerator the pipes 19 and 20 pass below the partition 2, being properly connected to the compressor unit 70, the recess or notch 3 permitting this passage and below this partition and back of the panel 4 is the usual compressor construction 70, 71, required with refrigerating devices of this character. The pipes 19 and 20 are of flexible material, such as copper, and it is not only possible but very feasible with the exercise of proper care to assemble the entire refrigerating unit and charge the same, and then ship the unit in charged and operative condition any distance desired to a refrigerator factory where the boxes are made, the flexible pipes 19 and 20 being coiled in connection with the tank and compressor so as to occupy the least space. Then when the refrigerating unit reaches its place of installation, the pipes are uncoiled and straightened and shaped into proper shape for installation. The panel 4 and rail 5 being removed the insertion of the refrigerating unit into the refrigerator is very readily accomplished, the panel 4 and rail 5 being replaced and the rail secured in place.

Figure 11:
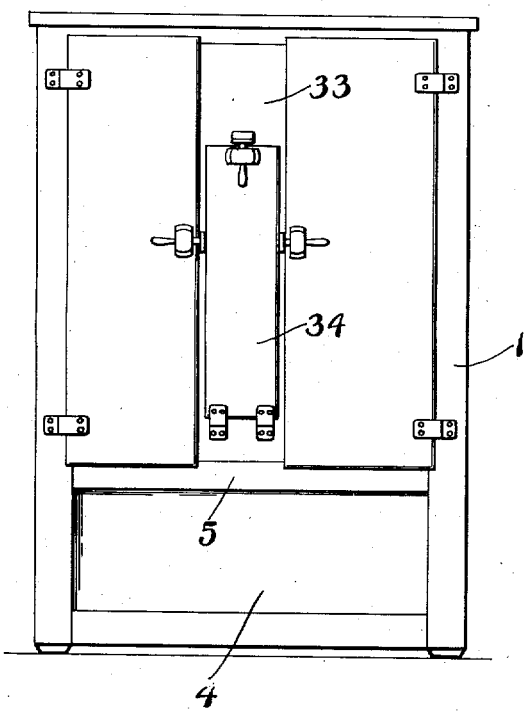
Fig. 11 is a front elevation of a slightly different form of refrigerator construction using the same invention.
Figure 13:
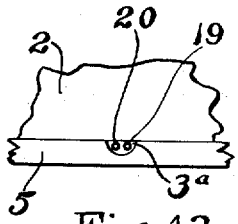
Fig. 13 is a fragmentary plan view of a slight modification in the construction for passing the refrigerant carrying pipes.
Figure 12:
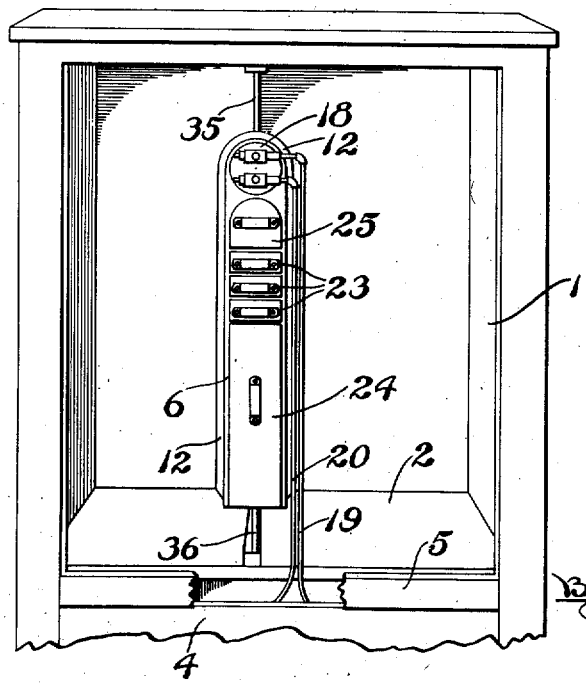
Fig. 12 is a fragmentary enlarged front elevation of the construction shown in Fig. 11, the doors and front panel being removed.

In Figs. 11 and 12 a slightly different form of installation in a refrigerator is shown and which is preferred. The refrigerator 1 has the same horizontal partition 2, front panel 4, said cross rail having a notch 3ª therein through which the pipes 19 and 20 may pass equivalent in all respects to the notch 3 in the partition 2 first described. At the front of the refrigerator a panel 33 is located in front of the tank and fitting against the same so as to be substantially tight. On this panel a hinged door 34 is mounted, the purpose of which is to gain access to the various compartments at 24 and 25 and the trays 23. Instead of the brackets 28 and the supports 30 and 31 being used to mount the tank, plates 35 and 36 at the upper and lower ends of the tank extending the full depth of the refrigerator are used. This divides the refrigerator into two entirely separate and independent compartments. It will be noted that the tank is located closer to one side of the refrigerator than the other and it will be evident that as the refrigerating action of the tank on one compartment is the same as in the other, the smaller compartment will be held to a lower degree of temperature than the larger. This is a very desirable feature in refrigerators and it is particularly desirable that various compartments in a refrigerator be had which are wholly independent and unconnected from the others. This permits the placing of certain articles in one compartment and others in another in accordance with the desired temperature at which these articles should be kept. Moreover the interior space in the tank is wholly independent of either compartment in the refrigerator and the several compartments in the tank are independent of each other, thereby increasing the range and number of separate storage spaces in the refrigerator, each of which is independent of the other and does not have to be opened when any one of the others is opened with a loss of efficiency. The doors which are used to close the compartments, one at each side of the tank, are independently mounted and may be independently opened and closed as is evident.

The construction described is very practical, is of light weight but of great strength and with it iceless refrigerators may be very simply and economically produced. Of course as stated before the tank construction is not limited in use to refrigerators alone but has many features of construction adapting it for a variety of other uses. The invention is defined in the appended claims and it is to be considered as comprehensive of all forms of structure coming within their scope irrespective of the particular use to which put.

I claim:

1. A device of the character described comprising, an inner shell having spaced apart sides and a connecting arch at their upper ends, an outer shell having spaced apart sides and arch located over the inner shell, said outer shell at its upper end being disposed a distance above the upper end of the inner shell and being formed with alternate outwardly projecting corrugations and intermediate connecting portions between the corrugations and permanently secured to the inner shell whereby a chamber is made between the arches of said inner and outer shells connecting with which are vertical spaces made by said outwardly extending corrugations between the same and the sides of the inner shell, means closing the said chamber at both ends thereof and a bottom plate extending between the lower edges of said shells and secured thereto, substantially as described.

2. In a device of the class described, the elements in combination defined in claim 1, said inner shell near the lower edges of its ends being formed with horizontally located inwardly pressed beads, and at upper portions of said sides with horizontally located inwardly pressed ribs, to thereby reinforce the inner shell and provide communicating passages between the spaces enclosed by the said outer corrugations and the sides of the inner shell.

3. In combination in a device of the class described, an inner shell including spaced apart sides of sheet metal and an integral arch connecting portion at their upper ends, an outer shell of sheet metal also having spaced apart sides and an integral connecting upper arch portion placed over the inner shell, said outer shell being formed with alternate outwardly extending corrugations and intermediate flat connecting portions, said outer shell being pressed over the inner shell with the said connecting portions in the sides of the outer shell lying against the sides of the inner shell and with the arch of the outer shell located a distance above the arch of the inner shell, whereby said connecting portions and the sides of the inner shell may be welded together, means closing each end of the compartment between the upper ends of the inner and outer shells, a bottom plate disposed between and connected to the sides of said shells at their lower edges, and a back plate closing the rear end of the inner shell, substantially as described.

4. A construction containing the elements in combination defined in claim 3, said sides of the inner shell adjacent their lower edges being formed with horizontal inwardly pressed beads, and adjacent their upper portions with a plurality of spaced apart inwardly extending horizontally located ribs, trays slidably mounted on said ribs, and removable means for closing the front ends of the spaces above and below said trays, substantially as described.

5. In a refrigerator apparatus an expansion chamber comprising an inner shell having spaced apart sides and a connecting arch at one end, an outer shell having spaced apart sides and a connecting arch at one end, said arches being spaced apart to provide an unobstructed chamber having arched top and bottom, one of said shells being corrugated, said shells being welded together at contiguous portions between the corrugations and at their peripheries to form a chamber for the expansion of refrigerant.

6. In a refrigerator apparatus an expansion chamber comprising an inner shell having spaced apart sides and a connecting arch at one end, an outer shell having spaced apart sides and a connecting arch at one end, said arches lying spaced apart to provide an unobstructed chamber having arched top and bottom, one of said shells being corrugated, said shells being fastened between the corrugations and at their peripheries to form a chamber for the expansion of refrigerant.

7. In a refrigerator apparatus an expansion chamber comprising an inner shell having spaced apart sides and a connecting plate therebetween, an outer shell having spaced apart sides and a connecting arch at one end, said arch and plate being spaced apart to provide an unobstructed chamber having an arched top, one of said shells having raised portions thereon, said shells being joined between the raised portions and at or near their peripheries to form a chamber for the expansion of refrigerant.

8. In a refrigerator apparatus an expansion chamber comprising an inner shell having spaced apart sides and a connecting arch at one end, an outer shell having spaced apart sides and a connecting arch at one end, said arches being spaced apart to provide an unobstructed chamber having arched top and bottom, one of said shells being corrugated, said shells being welded together at contiguous portions between the corrugations and end plates at either end of the chamber whereby a chamber for the expansion of refrigerant is formed.

9. A sheet metal evaporator comprising, an inner one-piece shell forming a plurality of sides of a freezing chamber, an outer one piece shell having a header portion and side wall portions extending therefrom downwardly along the side walls of the inner shell, and co-operating with said inner shell to form a refrigerant expansion chamber, one of said shells being corrugated to provide passageways communicating with said header, and said shells being fastened together by fusion at contiguous portions between their corrugations and sealed together at or near their peripheries.

10. A cooling unit for mechanical refrigerator comprising, an inner one piece shell bent to form walls of a freezing chamber or chambers, an outer one piece shell having an arcuate header portion and side walls extending therefrom along the freezing chamber walls, said outer shell header portion forming with a portion of the inner shell a header, one of said shells being embossed to provide passage-ways connecting with said header to form an expansion chamber for refrigerant.

11. A sheet metal evaporator comprising, an inner sheet metal casing forming a plurality of walls of a freezing chamber, a one piece sheet metal outer casing co-operating with said inner casing to form a refrigerant header and refrigerant passage-ways leading therefrom along a wall of the freezing chamber.

12. A sheet metal evaporator comprising an inner sheet metal casing forming a plurality of walls of a freezing chamber, a one piece sheet metal outer casing co-operating with said inner casing to form a plurality of refrigerant headers and refrigerant passage-ways connecting said headers.

13. A sheet metal evaporator comprising, an inner metallic sheet having an intermediate header portion and header portions on opposite sides thereof in spaced apart walls lying in different planes, an outer metallic sheet having an intermediate header portion and header portions on opposite sides thereof in spaced apart walls lying in planes substantially parallel to the walls of the inner sheet, one of said sheets being embossed with channels for refrigerant, said channels communicating with said headers, said sheets being superimposed together to register said header portions, and said sheets being fused together at contiguous portions between said channels, the sheets being sealed at or near their peripheries to form an expansion chamber for refrigerant.

14. In a refrigerator, a compartment containing a cooling unit, a compartment containing a compressor-condenser unit, a partition between said compartments, operative conduits between said units passing to one side of the partition and adjacent to a side wall of said refrigerator, and means permitting the insertion in the refrigerator of said units and interconnections in assembled form in planes substantially parallel to said partition.

15. In a refrigerator, a compartment containing a removable cooling unit, a machine compartment containing a removable refrigerating medium circulating unit, operative interconnections between said units, the walls of the refrigerator having openings to permit the insertion in said compartments of said units and interconnections in assembled form, and removable panel means for said openings, said interconnections passing adjacent to a side wall and a top wall within said cooling compartment.

16. In a refrigerating apparatus an expansion chamber comprising an inner shell fabricated from a single metallic sheet and having spaced apart sides and a connecting portion, an outer shell fabricated from a single metallic sheet and having spaced apart sides and a connecting portion, one of the shells being corrugated, said shells being joined together at contiguous portions between the corrugations and sealed together in the vicinity of their edges.

17. A sheet metal evaporator comprising an inner casing forming the top, bottom, and side walls of a freezing chamber, an outer casing fabricated from a single metallic sheet having substantial flat areas inwardly and in the vicinity of its peripheries contiguous to said inner casing, said casings being fastened together by fusion at contiguous portions and sealed together in the vicnity of their peripheries to provide an expansion chamber for refrigerant.

18. A cooling unit for a refrigerator comprising an inner casing forming the top, bottom, back and side walls of a freezing chamber, an outer casing fabricated from a single metallic sheet having substantial flat areas inwardly and in the vicinity of its peripheries contacting with said inner casing, said casings being fastened together by fusion at contiguous portions and sealed together in the vicinity of their peripheries to provide an expansion chamber for refrigerant.

19. A heat absorbing unit for a refrigerator comprising an inner casing defining a freezing chamber, an outer casing fabricated from a single metallic sheet and superposed upon said inner casing to provide in conjunction therewith a refrigerant expansion chamber, one of said casings being embossed along a side wall of the freezing chamber to provide passageways for refrigerant within said expansion chamber, said casings having portions spaced apart forming a refrigerant header connected to said passageways, said casings being fastened together by fusion with contacting portions between said passageways, and being sealed together in the vicinity of their peripheries.

20. An evaporator comprising inner and outer casings each fabricated from a single metallic sheet and forming at least three sides of a freezing chamber, said casings being nested together to provide an expansion chamber therebetween said casings having flat contacting portions inwardly of their peripheries and being fused together at such flat portions and being also sealed together in the vicinity of their peripheries.

21. In a cooling unit for a refrigerator, a plurality of elongated headers disposed at different elevations and a plurality of ducts connecting the headers, said headers and ducts being formed by and between two sheets of metal, said sheets having flat contacting portions bet..een the ducts connected by fusion and being sealed together in the vicinity of their peripheries.

22. A sheet metal evaporator comprising an inner casing fabricated from a single metallic sheet forming two side walls and a wall connecting the side walls of a freezing chamber, an outer corrugated casing fabricated from a single metallic sheet, said outer casing being superimposed upon said inner casing to form therewith an expansion chamber for refrigerant about the two side walls and the wall connecting the side walls of said freezing chamber, said casings being fastened together at contacting portions between said corrugations, means to seal said sheets together at peripheral portions, the ends of the side walls opposite the connecting walls being fastened together by fusion.

23. In a refrigerating apparatus, an inner sheet metal casing defining a freezing compartment, an outer casing fabricated from a single metallic sheet cooperating with said inner casing to provide an expansion chamber, one of said casings being corrugated to provide refrigerant passageways, said casings being fastened together by fusion at contacting portions between the corrugations and being sealed together in the vicinity of their peripheries.

24. In a sheet metal evaporator, an inner casing fabricated from a single metallic sheet and forming a plurality of sides of a freezing chamber, an outer casing fabricated from a single metallic sheet and cooperating with said inner sheet to form walls of an expansion chamber, one of said sheets being corrugated to provide in conjunction with the other sheet passageways for refrigerant, and said sheets being fastened together by fusion at contacting portions between the corrugations and sealed together in the vicinity of their peripheries.

25. An evaporator for refrigerating apparatus, comprising wall structures fabricated of sheet metal defining a plurality of sides of a freezing chamber and including a header and ducts extending from the header and one or more transverse corrugations forming passageways connecting said ducts.

26. An evaporator for refrigerating apparatus, comprising wall structure fabricated of sheet metal forming a plurality of sides of a freezing chamber and a wall of an expansion chamber, said wall structure being corrugated transversely to form a shelf-supporting ledge, and a removable support for matter to be refrigerated having a substantial area in contact with said transversely corrugated portion.

27. An evaporator for refrigerating apparatus, comprising wall structure fabricated of sheet metal forming a plurality of sides of a freezing chamber and a wall of an expansion chamber, said wall structure being corrugated, and a metallic shelf extending between and fused to the sides of the freezing chamber.

28. A cooling unit of the flooded type, comprising a float chamber the sides of which are formed of walls fabricated from contiguous metallic sheets, one of said sheets being corrugated, said sheets meeting and contacting except for said corrugations and said float chamber sides and extending from the chamber to form refrigerant passageways and at least two walls of an ice freezing chamber.

29. A sheet metal evaporator comprising an inner shell having spaced apart side wall portions and a header portion and an outer shell having spaced apart side wall portions and a header portion, said shells being nested together with the header portions in registration to form a header, one of said shells having its side wall portions corrugated to provide refrigerant passageways connecting with the header portion, said shells being fastened together by fusion and sealed peripherally.

30. In a refrigerating apparatus an expansion chamber comprising an inner shell having spaced apart sides and a connecting arch at one end, an outer shell having spaced apart sides and a connecting arch at one end, said arches being spaced apart to provide an unobstructed chamber having arched top and bottom, one of said shells being corrugated, said shells being welded together at contiguous portions between the corrugations and at their peripheries to form a chamber for the expansion of refrigerant, said arches being similarly curved.

31. An evaporator fabricated of sheet metal to form a liquid distributing and spreading chamber and a liquid and gas chamber at its upper portion disposed substantially parallel to and communicating for a substantial portion of its length with said liquid distributing and spreading chamber, portions of each of the said chambers contributing to form the walls of a freezing chamber, the walls of the liquid distributing and spreading chamber being fused together at spaced intervals.

32. An evaporator for refrigerating apparatus including wall structure fabricated of sheet metal and forming a plurality of walls of a freezing chamber, said wall structure including a chamber and closed corrugations forming refrigerant passageways communicating with said chamber, said passageways communicating with the lowest portion of said chamber.

33. For refrigerating apparatus, an evaporator fabricated of sheet metal enclosing an upper enlarged chamber and a plurality of dependent elongated ducts communicating at their upper ends with said chamber, portions of said chamber and said ducts defining walls of a freezing chamber, said ducts being formed by corrugations in the metal providing a plurality of lines of contact between cooperating portions of metal and intermediate separated portions, said metal being in fused relation at spaced intervals at the lines of contact.

34. In a refrigerator apparatus, evaporator walls comprising two sheets of metal shaped to form header walls and provided with corrugations to form refrigerant passageways extending therefrom.

35. For refrigerating apparatus, an evaporator fabricated of sheet metal forming a plurality of walls of a freezing chamber comprising wall structure enclosing a refrigerant chamber and tube-like passageways extending from and communicating with said chamber, said passageways being formed by corrugations in the metal wall structure.

36. An evaporator fabricated of sheet metal forming an elongated liquid distributing and spreading chamber and an elongated liquid and gas chamber arranged in substantially parallel relation to and communicating for a substantial portion of its length with said liquid distributing and spreading chamber, the walls of the liquid distributing and spreading chamber being fused together at spaced intervals, one wall of said liquid and gas chamber being transversely corrugated to increase its strength.

37. A sheet metal container adapted for a volatile refrigerant undergoing a change of state when heat is transferred through the walls of said container comprising two sheets of metal indented so as to form an elongated header wall portion and extending wall portions forming a plurality of channels connecting at one end to said header, said sheets being fastened together by fusion at contacting portions along lines defining said channels, and said sheets being sealed together at or near their peripheries.

38. A sheet metal cooling unit comprising a float chamber having sides formed by portions of two shells, each of said shells being fabricated from single metallic sheets, said shells extending in contacting relation from the float chamber, one of said shells being embossed at the extended portion for refrigerant passage-ways, said passage-ways connecting to said float chamber, said shells being fastened together by fusion intermediate the peripheries of the extended portions, said shells being sealed together near their edges, in combination with a float valve to regulate the flow of refrigerant into said float chamber.

This specification signed this 3rd day of September, 1930, at Detroit, Michigan.

DELOS P. HEATH.